United States Patent
Vendrow et al.

(10) Patent No.: US 9,247,050 B2
(45) Date of Patent: Jan. 26, 2016

(54) TELECOMMUNICATIONS SERVICES ACTIVATION

(75) Inventors: Vlad Vendrow, Redwood City, CA (US); Bruce Young, San Jose, CA (US); Praful Shah, Los Altos Hills, CA (US); Boris Elpiner, Sunnyvale, CA (US); Vladimir G. Shmunis, Hillsborough, CA (US)

(73) Assignee: RingCentral, Inc., Belmont, CA (US)

( * ) Notice: Subject to any disclaimer, the term of this patent is extended or adjusted under 35 U.S.C. 154(b) by 1487 days.

(21) Appl. No.: 12/156,457

(22) Filed: May 30, 2008

(65) Prior Publication Data

US 2009/0296907 A1    Dec. 3, 2009

(51) Int. Cl.
| | |
|---|---|
| *G05B 19/418* | (2006.01) |
| *G06F 9/46* | (2006.01) |
| *G06Q 10/00* | (2012.01) |
| *H04M 3/42* | (2006.01) |
| *G06Q 10/08* | (2012.01) |
| *G06Q 20/20* | (2012.01) |
| *G06Q 10/06* | (2012.01) |

(52) U.S. Cl.
CPC ............ *H04M 3/4234* (2013.01); *G06Q 10/06* (2013.01); *G06Q 10/08* (2013.01); *G06Q 10/087* (2013.01); *G06Q 10/0875* (2013.01); *G06Q 20/203* (2013.01); *H04M 3/42153* (2013.01)

(58) Field of Classification Search
CPC ... G06Q 10/087; G06Q 20/203; G06Q 10/08; G06Q 10/0875; G06Q 10/06
USPC .................... 705/8, 28; 379/201, 0.12, 201.02
See application file for complete search history.

(56) References Cited

U.S. PATENT DOCUMENTS

| | | | | |
|---|---|---|---|---|
| 4,970,721 A | * | 11/1990 | Aczel ................... | H04Q 1/0407 370/355 |
| 5,425,101 A | * | 6/1995 | Woo .................... | H04B 7/18578 370/409 |
| 5,696,906 A | * | 12/1997 | Peters ................ | G06Q 30/0283 348/E7.049 |
| 5,812,533 A | * | 9/1998 | Cox ..................... | H04Q 3/0054 370/259 |
| 5,870,383 A | * | 2/1999 | Eslambolchi ....... | H04M 3/4228 370/230 |
| 5,883,946 A | * | 3/1999 | Beck ................... | H04M 3/4228 379/201.12 |
| 5,923,745 A | * | 7/1999 | Hurd ................... | H04M 3/523 379/220.01 |

(Continued)

OTHER PUBLICATIONS

Cisco sets New Era by Anonymous: title: Al Bawaba: London, May 29, 2008, 3 pages.*

(Continued)

*Primary Examiner* — Matthew Gart
*Assistant Examiner* — Harshad Parikh
(74) *Attorney, Agent, or Firm* — Fish & Richardson P.C.

(57) ABSTRACT

Embodiments of the invention relate generally to computing devices and systems, as well as software, computer programs, applications, and interfaces, and more particularly, to systems, devices and methods to activate telecommunications services. For example, a method may include configuring configuration data for a user account, the configuration data specifying a subset of telecommunications services for one or more user accounts, presenting in an interface an identifier for accessing the subset of telecommunications services, receiving data representing a request to activate the subset of telecommunications services associated with the identifier, the data representing the request including a user identification number, and activating the user account to include the subset of the telecommunications services, wherein configuring the configuration data occurs prior to presenting the identifier.

23 Claims, 11 Drawing Sheets

(56) References Cited

U.S. PATENT DOCUMENTS

| | | | | |
|---|---|---|---|---|
| 5,946,623 A * | 8/1999 | Spradlin | H04W 76/00 | 455/414.3 |
| 5,953,400 A * | 9/1999 | Rosenthal | H04M 3/44 | 379/202.01 |
| 5,954,799 A * | 9/1999 | Goheen | H04L 12/6418 | 370/351 |
| 5,978,462 A * | 11/1999 | Fuhrmann | H04M 3/51 | 379/115.01 |
| 5,991,292 A * | 11/1999 | Focsaneanu | H04L 12/2801 | 370/352 |
| 5,995,610 A * | 11/1999 | Smidt | H04Q 3/0029 | 379/207.02 |
| 6,005,845 A * | 12/1999 | Svennesson | H04M 3/432 | 370/260 |
| 6,041,110 A * | 3/2000 | Lautenschlager | H04Q 3/0029 | 379/201.02 |
| 6,122,363 A * | 9/2000 | Friedlander | G06Q 20/341 | 370/466 |
| 6,185,545 B1 * | 2/2001 | Resnick | G06Q 20/02 | 705/40 |
| 6,199,066 B1 * | 3/2001 | Glitho | H04L 41/044 | |
| 6,208,640 B1 * | 3/2001 | Spell | H04L 47/10 | 370/358 |
| 6,230,024 B1 * | 5/2001 | Wang | H04W 76/02 | 455/426.1 |
| 6,445,694 B1 * | 9/2002 | Swartz | H04L 12/5835 | 370/352 |
| 6,480,890 B1 * | 11/2002 | Lee, Jr. | G06Q 20/04 | 379/201.03 |
| 6,493,334 B1 * | 12/2002 | Krzymien | H04B 1/7103 | 370/324 |
| 6,628,767 B1 | 9/2003 | Wellner et al. | | |
| 6,691,151 B1 * | 2/2004 | Cheyer | G06F 9/465 | 707/E17.071 |
| 6,891,941 B1 * | 5/2005 | Barthel | H04Q 3/0029 | 379/201.01 |
| 6,975,622 B2 * | 12/2005 | Korycki | H04L 12/66 | 370/260 |
| 7,149,698 B2 * | 12/2006 | Guheen | G06Q 99/00 | 705/319 |
| 7,180,638 B1 * | 2/2007 | Hou | H04N 1/00214 | 358/402 |
| 7,227,942 B2 * | 6/2007 | Deo | H04M 3/42136 | 379/219 |
| 7,274,684 B2 * | 9/2007 | Young | H04L 12/4633 | 370/352 |
| 7,308,081 B2 * | 12/2007 | Trandal | H04M 3/48 | 379/207.02 |
| 7,512,117 B2 * | 3/2009 | Swartz | H04L 12/58 | 370/352 |
| 7,523,172 B2 * | 4/2009 | Mouhanna | H04L 41/0803 | 709/217 |
| 7,643,627 B2 * | 1/2010 | Starling | H04M 3/42153 | 370/352 |
| 7,760,711 B1 * | 7/2010 | Kung | H04L 12/14 | 370/352 |
| 7,792,709 B1 * | 9/2010 | Trandal | G06Q 30/02 | 705/26.1 |
| 7,839,803 B1 * | 11/2010 | Snelgrove | H04M 3/56 | 370/235 |
| 7,941,197 B2 * | 5/2011 | Jain | G06K 19/07739 | 379/433.05 |
| 8,023,479 B2 * | 9/2011 | Silver | H04W 76/022 | 370/338 |
| 8,548,908 B2 * | 10/2013 | Friedman | G06Q 20/20 | 705/41 |
| 8,655,759 B2 * | 2/2014 | Frankel | G06Q 40/00 | 705/35 |
| 2002/0037075 A1 * | 3/2002 | Flanagan | H04M 15/44 | 379/201.12 |
| 2002/0080025 A1 * | 6/2002 | Beattie | G08B 25/008 | 340/506 |
| 2004/0107125 A1 * | 6/2004 | Guheen | G06Q 99/00 | 705/319 |
| 2005/0008000 A1 * | 1/2005 | Korycki | H04L 12/66 | 370/352 |
| 2005/0117733 A1 * | 6/2005 | Widger | H04M 3/436 | 379/221.05 |
| 2005/0256952 A1 * | 11/2005 | Mouhanna | H04L 41/0803 | 709/223 |
| 2006/0008066 A1 * | 1/2006 | Starling et al. | | 379/201.03 |
| 2006/0008069 A1 * | 1/2006 | Deo | H04M 3/42136 | 379/221.06 |
| 2006/0015580 A1 * | 1/2006 | Gabriel | H04N 7/17309 | 709/219 |
| 2006/0094466 A1 * | 5/2006 | Tran | H04B 1/3877 | 455/558 |
| 2007/0287473 A1 * | 12/2007 | Dupray | H04W 4/02 | 455/456.1 |
| 2008/0013705 A1 * | 1/2008 | Yoffie | G06Q 10/109 | 379/201.12 |
| 2008/0255947 A1 * | 10/2008 | Friedman | G06Q 20/20 | 705/35 |
| 2009/0012826 A1 * | 1/2009 | Eilam | G06Q 30/02 | 705/7.31 |
| 2009/0070272 A1 * | 3/2009 | Jain | G06K 19/07739 | 705/75 |
| 2009/0080029 A1 * | 3/2009 | Vendrow | H04N 1/00212 | 358/402 |
| 2009/0086947 A1 * | 4/2009 | Vendrow | H04M 3/02 | 379/201.12 |
| 2009/0086950 A1 * | 4/2009 | Vendrow | H04M 3/493 | 379/202.01 |
| 2009/0110168 A1 * | 4/2009 | Colson | H04M 3/42272 | 379/201.12 |
| 2009/0190735 A1 * | 7/2009 | Gilmartin | B60R 16/0373 | 379/201.12 |
| 2009/0201919 A1 * | 8/2009 | Swartz | H04L 12/58 | 370/352 |
| 2009/0232292 A1 * | 9/2009 | Baalbergen | H04M 11/04 | 379/207.02 |
| 2009/0296907 A1 * | 12/2009 | Vendrow | H04M 3/4234 | 379/201.03 |
| 2010/0099390 A1 * | 4/2010 | Vendrow | H04M 3/42153 | 455/414.1 |
| 2010/0128862 A1 * | 5/2010 | Vendrow | H04M 3/38 | 379/198 |
| 2010/0184408 A1 * | 7/2010 | Vendrow | H04M 3/42153 | 455/411 |
| 2010/0323681 A1 * | 12/2010 | Corda | G06Q 20/223 | 455/419 |
| 2011/0047466 A1 * | 2/2011 | Michelman | G06F 9/4443 | 715/734 |
| 2011/0130168 A1 * | 6/2011 | Vendrow | H04M 1/57 | 455/556.1 |

OTHER PUBLICATIONS e_tags Smart electronic tagging: Buainess wire, New York, Mar. 26, 2007 News release.*

Make your voice heard on our forum by Rachel Johnson, McClatcy-Tribune News, Washington, DC Apr. 23, 2008.*

Martin Dawes Systems Unveils Business Proccess Engine : PR Newswire Europe including UK Disclose. New York, Apr. 17, 2008.*

Copenheaver, Blaine R., Notification of Transmittal of the International Search Report and the Written Opinion of the International Searching Authority, or the Declaration, PCT/US2009/045703, Jul. 29, 2009, Form PCT/ISA/220 (3 pages), PTO/ISA/210 (2 pages).

Low, 'The Internet Telephone Red Herring', HP Laboratories Technical Report, XX, XX, No. 96/98, May 15, 1996, pp. 1-15 XP002043669.

EPO Search Report in EP Application No. 09755791.2 mailed Mar. 5, 2013, 7 pages.

* cited by examiner

Your Customers Call One Number — 310d

- ( • ) [ 1 (866) 555-4321 ] — 311d
- ( ○ ) [ (Select a different number) ▼ ] — 312d
- [ (Enter Your-Company-Name) ] — 313d Auto-Receptionist:

> "Thank you for calling <Your-Company-Name>. If you know the extension of the party you are calling, please enter it now. Press 1 for Sales, Press 2 for John, Press 3 for Fax ..."

Answer calls to 1 (866) 555-4321 on your telephone. Please enter at least one telephone number for extension 1 (default extension).

Extension [ 1 ] :

- Phone Number [_____] — 314d
- Additional Phone Number [_____] — 315d

Extension [ 2 ] :

- Phone Number or Email Address [_____] — 316d

Extension [ 3 ] :

- Fax Number or Email Address [_____] — 317d ( Sign Up ) — 318d

FIG. 3D

TELECOMMUNICATIONS SERVICES ACTIVATION

FIELD OF THE INVENTION

Embodiments of the invention relate generally to telecommunications services, and more particularly, to interfaces, systems, devices and methods to facilitate, for example, real-time activation of telecommunications services, such as call forwarding, routing, virtual PBX, message handling, and service management, among others.

BACKGROUND

Conventional techniques for activating telecommunications services typically require users to go through a multiple-stage process. Even for a user who is evaluating a telecommunications service, the user is typically required to experience a multiple-stage process and delays between stages before being able to evaluate a telecommunications service to decide whether to use the telecommunications service. For example, a user is typically asked, in one stage, to provide contact information (e.g., name, address, or other contact information). In the alternative or in another stage, a user is typically asked to provide billing information (e.g., a credit card number). After contact and billing information has been provided, if required, activating a telecommunications service is itself a multiple-stage process.

FIG. 1 depicts an interface 100 typically used in traditional telecommunications service activation techniques. In a typical telecommunications service activation process, a window 102 is presented to a user in response to a request (not shown) to activate a telecommunications service. Window 102 includes an activation option ("Next") 104, which can be a link. As FIG. 1 shows, window 102 transitions to window 112 when the user selects activation option 104. The user then is presented with window ("Provisioning Panel") 112 to provide data to a conventional backend system 115 to provision a telecommunications service. Conventional backend system 115 operates to provision, configure and/or activate telecommunications services, such as a virtual PBX. The user typically experiences a transition back to window 102 if the user desires to review information regarding the telecommunications service. In some conventional backend systems, the user can also experience a delay before being able to proceed to the next step of an activation process, which typically resumes with window 102. To configure the telecommunications service, a user usually is required to transition from either window 102 or 112, by choosing either selection ("Next") 104 or selection ("Next") 106, respectively. Again, the user traditionally experiences another transition to window ("Configuration Panel") 122 to interact with conventional backend system 115 to configure the telecommunications service. Yet again, a user encounters further delays when the user transitions back to window 102, should, for example, the user desires to review information regarding the selected telecommunications service. The back-and-forth activation process continues between window 102 or 122 and window ("Activation Panel") 132 to activate the telecommunications service. By requiring the user to interact with two or more windows 102, 112, 122, and 132, the multiple-stage, back-and-forth process interrupts the user experience during activation. Thus, a user experiences numerous transitions in the process of procuring telecommunications services. It is also expected that, after each stage, some users decide not to continue with the relatively cumbersome activation process, resulting in the loss of potential customers or customers.

Thus, a solution is needed to provide a method and a system for activating telecommunications services, without the limitations of conventional techniques.

BRIEF DESCRIPTION OF THE DRAWINGS

The invention and its various embodiments are more fully appreciated in connection with the following detailed description taken in conjunction with the accompanying drawings, in which:

FIG. 3D illustrates further another interface to activate telecommunications services, according to at least one embodiment of the invention;

DETAILED DESCRIPTION

Figure 1:
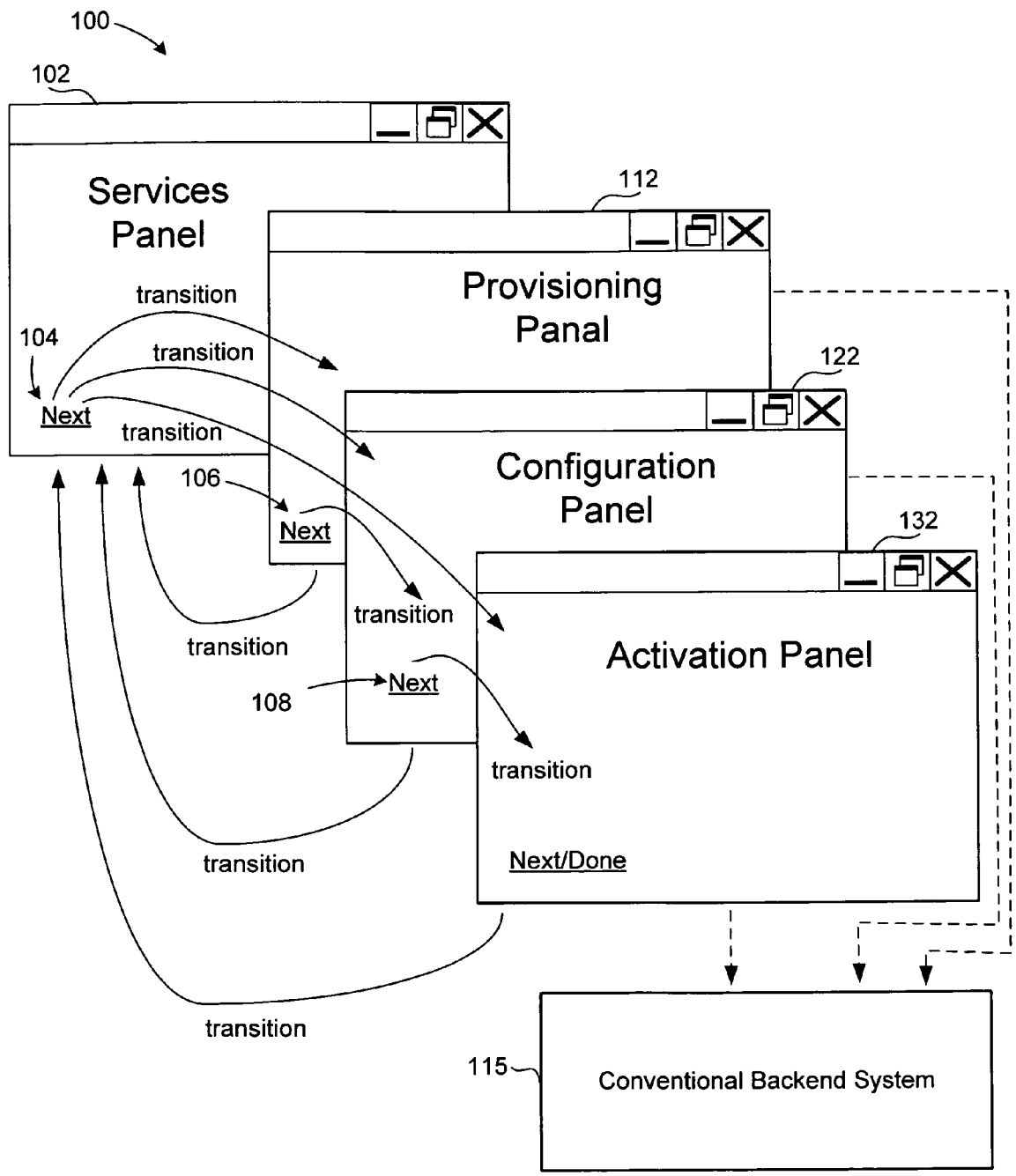
FIG. 1 illustrates a block diagram of typical conventional telecommunications service activation techniques.
Figure 2:
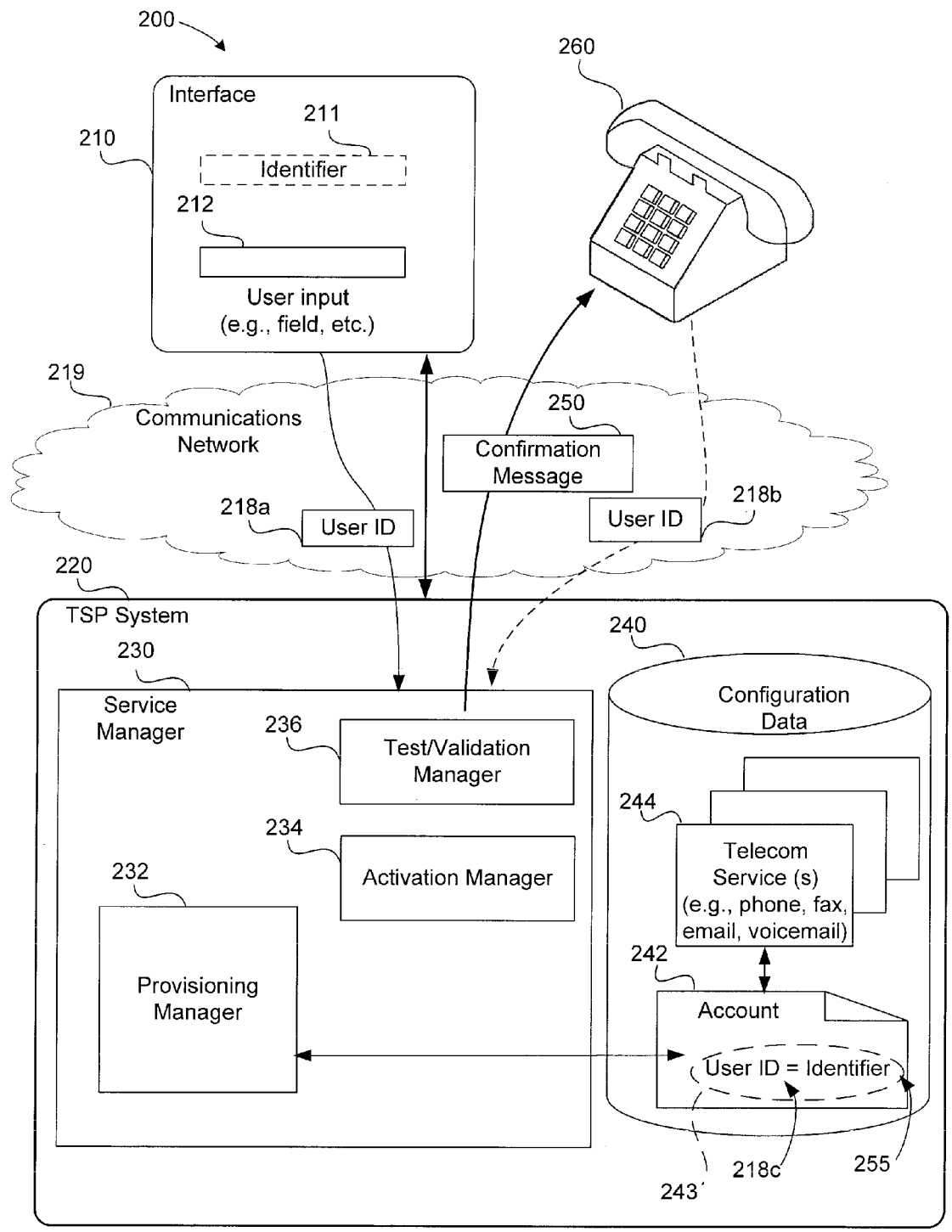
FIG. 2 is a diagram of an exemplary telecommunications service provider system, according to at least one embodiment of the invention.

FIG. 2 is a diagram of an exemplary telecommunications service provider system, according to at least some embodiments of the invention. According to the example shown in diagram 200, telecommunications service provider ("TSP") system 220 can include a service manager 230 and a repository 240. Service manager 230 can be configured to receive data representing a request to activate telecommunications services. The data can include user identification information, such as user ID 218a or user ID 218b, either of which can be sufficient to activate the telecommunications services, according to various embodiments. TSP system 220 can be configured to receive user IDs 218a and 218b via a communications network 219 from an interface 210 or any communications device, such as a phone 260. Repository 240 can be configured to store data representing configuration data 244 for configuring the telecommunications services. In at least some embodiments, configuration data 244 can be pre-configured to provide a discrete set of telecommunications services that, for example, can be activated by service manager 230 using user IDs 218a or 218b, without requiring other information. Configuration data 244 can include an identifier 255 for accessing the telecommunications services, identifier 255 being associated with other configuration data 244 either prior to, or after, TSP system 220 receives the data representing the request to activate the telecommunications services.

In at least one embodiment, TSP system 220 can be configured to generate signals for transmission to phone 260 to confirm successful activation of the telecommunications services. For example, confirmation message 250 can include signals that cause phone 260 to ring, among other things, thereby confirming that a call to identifier 255 can be routed to a communications device associated with user IDs 218a or 218b. Thus, identifier 255 can specify a main telephone number for accessing a subset of telecommunications services for a private branch exchange ("PBX") service. User IDs 218a and 218b then can represent a telephone number for phone 260 that is reachable via identifier 255 as an extension of the PBX service, according to at least some embodiments. Note that user IDs 218a and 218b can represent the same user identification number, but indicate that the user identification number may have been obtained by different techniques (e.g., by way interface 210 or by way of call data). As used herein, the term "identifier" can refer, at least in some embodiments, to a telephone number (e.g., a toll-free telephone number, such as a main telephone line) for accessing telecommunications services. An identifier can also be an email address, or any other symbol (or set of symbols) that represents a common contact identifier for a group of contact identifiers, such as a group of extension numbers of a PBX. Prior to activation, an identifier can be associated with a subset of telecommunications services of TSP system 220 that are yet to be provisioned and activated. As used herein, the term "user identification number" (e.g., user ID) can refer, at least in some embodiments, to a contact identifier that can be associated with one contact identifier (e.g., one extension number) in a group of contact identifiers (e.g., a group of extension numbers), such as a telephone number for phone 260. A "user identification number" can also be a facsimile number for a fax machine (not shown), an email address of an email account (not shown), a voicemail address, or any other address.

In at least some embodiments, TSP system 220 can generate interface 210 to present a user input, which can be a field 212 configured to accept data, such as user identification information (e.g., such as a user identification number, which can be represented as user ID 218a). Optionally, TSP system 220 can generate a representation 211 of an identifier to present in interface 210. The identifier, in some instances, can be a toll-free number as a main telephone line associated with the subset of telecommunications under activation. Interface 210 can be accessible as a web page at a particular URL. In at least one embodiment, TSP system 220 can present field 212 simultaneous (or substantially simultaneous) to the presentation of representation 211 of the identifier. In at least one embodiment, TSP system 220 can configure configuration data 244 (or a portion thereof) prior to presenting either field 212 or representation 211 of an identifier, or both. As such, little or a negligible amount of information can be sufficient to provision a subset of telecommunications services, which can be defined by the pre-configured portions of configuration data 244. Thus, the subset of telecommunications services can operate as a default set of services, thereby reducing or eliminating a need for a user to perform an initial and/or a complicated configuration of telecommunications services. Further, TSP system 220 can maintain the presentation of interface 210 during the activation of the subset of telecommunications services, without transitioning to other interfaces. In view of the foregoing, discrete set of telecommunications services can be provisioned and activated without transitioning away from interface 210. In accordance with various embodiments, this can simplify the procurement of telecommunications services that constitute, for example, a virtual PBX.

In at least some embodiments, TSP system 220 can access call data associated with a request call to TSP system 220. A "request call" can refer, at least in some embodiments, to call originating at a communication device (e.g., phone 260) and connecting with TSP system 220 to provision and/or activate a subset of telecommunications services. "Call data" can refer, at least in some embodiments, to supplemental data that can accompany a communication, such as a phone call. Examples of call data include the data provided as automatic number identification ("ANI") data, calling name ("CNAM") data, dialed number identification service ("DNIS") data, or any other type of telephony or communication-related data, including user-entered data, or any combination thereof. TSP system 220 can access call data to extract a user identification number, such as user ID 218b, from the call data, and can use the user identification number to sufficiently provision and activate telecommunications services, according to embodiments of the invention. Consider an example in which phone 260 generates a call to, for example, an identifier. Using call data, TSP system 220 can determine whether the call is to an unprovisioned identifier (e.g., a user identification number is yet to be associated with an identifier), thereby identifying whether the call is a request to procure telecommunications services.

In at least some embodiments, TSP system 220 can test and validate successful activation of the subset of telecommunications services, and then can confirm the validation by, for example, generating a call including a confirmation message 250 to phone 260. If the user identification number is entered into interface 210, then TSP system 220 can generate a call to the user identification number to confirm activation of the subset of telecommunications services. In some instances, the call including confirmation message 250 to the user identification number can be generated, and received by phone 260, substantially simultaneous to the presentation of either field 212 or representation 211 of the identifier in interface 210. If the user identification number was extracted from call data accompanying a call from phone 260 to TSP system 220, then confirmation message 250 can also include an automated-voice notification that the activation has been complete. The validation call can connect to phone 260 in a "call waiting" state (if available), should the user be connected to TSP system 220 during the validating call. Thus, a prospective user of TSP system 220 can receive immediate (or nearly immediate) feedback as to whether its telecommunications services have been provisioned and activated for use.

In the example shown, service manager 230 can include one or more of the following: a provisioning manager 232, an activation manager 234, and a test/validation manager 236. Provisioning manager 232 can operate to configure configuration data 244 to provide a subset of telecommunications services in association with, for example, a user account 242. While user account 242 can be associated with its own identifier (e.g., a user account ID), which is not shown, user account 242 can include data representing user identification information (e.g., user IDs 218a and 218b), data representing identifier 255, and data representing an association between the user identification information and data representing identifier 255. Note that while provisioning manager 232 can operate to configure configuration data 244 prior to receiving a request to provision a set of default services, as an example, provisioning manager 232 can operate to configure configuration data 244 after receiving the request.

To provision telecommunications services once a request has been made, provisioning manager 232 can determine either a user ID 218c or an identifier 255, or both, and form an association 243 with which to activate telecommunications services. In some instances, provisioning manager 232 can determine both user ID 218c and an identifier 255, and configure user account 242 to include them. For example, user ID 218c can be received as user ID 218a via interface 210, or it can be received as user ID 218b via call data from a call from phone 260. In at least one instance, identifier 255 can be selected when a user selects representation 211 of an identifier from a pool of identifiers. Provisioning manager 232 can determine the selected identifier and store it in user account 242, and can remove the selected identifier from the pool of identifiers so that it can no longer be provisioned. In at least one other instance, identifier 255 can be generated without feedback from the user (e.g., as a pre-determined identifier that can be pre-selected or randomly determined), with provisioning manager 232 storing the pre-determined identifier in user account 242 as identifier 255. In this case, either ID 218a or ID 218b can be sufficient for provisioning, configuring and activating telecommunications services, according to the various embodiments. Thus, a user need not enter a selection for an identifier or other information.

Activation manager 234 can be configured to activate user account 242 once it has been provisioned with configuration data defining a subset of telecommunications services. Thereafter, identifier 255 can be used to access the activated subset of telecommunications services. For example, if identifier 255 is a telephone number, then the telephone number can be a main line that can provide access to the telecommunications services defined by, for example, user account 242. In some embodiments, test/validation manager 236 can optionally be used to validate successful provisioning and activation of the subset of telecommunications services. For example, to validate a telephone number provided as user ID 218a, test/validation manager 236 can be configured to make a call to the telephone number associated with phone 260. In other examples, user ID 218a can be an email address. Thus, test/validation manager 236 can be used to send an email message to the email address to validate that the email address can be implemented as an extension.

According to at least some embodiments, a single submission of data (e.g., user ID 218a) to TSP system 220 can enable a user to acquire an account to use telecommunications services. There may not be a need for the user to provide other data (e.g., contacting, billing, configuration, or other information) to activate telecommunications services. After user account 242 is activated, then the telecommunications services can be used. That is, a user can start using the identifier (e.g., a toll-free telephone number) associated with a subset telecommunications services as a common contacting identifier 255 (or address) nearly instantaneously, so that third parties can immediately access the associated telecommunications services (e.g., the user's customers can contact the user at an extension reachable via identifier 255). For example, if the subset of service includes a call-forwarding service, a call made to the toll-free telephone number (i.e., identifier 255) can be forwarded to a telephone number, such as user ID 218a.

According to various embodiments, examples of interface 210 include physical interfaces (e.g., a telephone or a display on the telephone) and virtual interfaces (e.g., a web page, panel, window, display, palette, tab, screen, or the like). In some embodiments, a user can provide additional data in a single submission to request activation of telecommunications services. Further, TSP system 220 can include one or more servers, software applications, application programmable interfaces ("APIs"), logic (e.g., software or electrical/hardware logic), or any combination thereof. For example, service manager 230 can include a provisioning manager 232, an activation manager 234, a test/validation manager 236, and other components, such as a configuration manager (not shown), any of which can be implemented in hardware, software, or any combination thereof.

According to various embodiments, a subset of telecommunications services can be associated with configuration data that represents any combination of telecommunications services, such as call forwarding, call routing, facsimile, email, text messaging, voice messaging (i.e., voicemail), extensions, private branch exchange ("PBX") services, and the like. For example, a subset of telecommunications services can include a configuration for a call-forwarding service. Another subset of telecommunications services can include a configuration for a hosted or virtual PBX service. Thus, a default configuration for a subset of telecommunications services can be stored in repository 240 as, for example, configuration data 244.

As used herein, the term "single submission," such as single submission of data, at least in one embodiment, can refer to sending, providing, or transmitting sufficient data to activate or request telecommunications services from an interface without requiring an interface transition to provide additional data to request the same telecommunications services. Examples of single submissions of data can include one or more of the following: making a telephone call, clicking a button on a web page (e.g., "submit," "send," or "activate" button, or the like), and initiating data transmission using, for example, a single action. As used herein, the term "provisioning," at least in one embodiment, can refer to providing telecommunications services to a user or customer, including transmission of voice, data, or both to a telephone number, facsimile number, email address, voicemail address, the like, or any combination thereof. As used herein, the term "telephone," can refer to any telephone or communications device using any type of telephony or communications technology, such as a telephone using voice over internet protocol technology ("VoIP"), cellular phone technology (e.g., Global System for Mobile communication ("GSM"), Time-Division Multiple Access ("TDMA"), or Code-Division Multiple Access ("CDMA")), or any other technology, or any telephone connected to a communications network 219, which can be a public switched telephone network ("PSTN") network, a wireless network, the Internet, a WLAN, LAN, or any other communications network. As used herein, the term "configuring," at least in one embodiment, can refer to modifying data for a user account to configure one or more telecommunications services. As used herein, the term "activating," at least in one embodiment, can refer to enabling a user account and its data (e.g., configuration data) to provide telecommunications services. In some embodiments, the above-described system, components, elements, and processes can be varied in number, structure, function, configuration, implementation, or other aspects and are not limited to those shown and described.

Figure 3A:
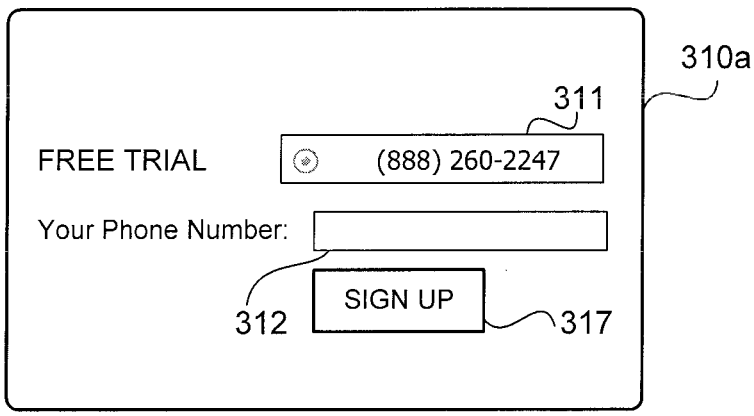
FIG. 3A illustrates an exemplary interface to activate telecommunications services, according to at least one embodiment of the invention.

FIG. 3A illustrates an exemplary interface to activate telecommunications services, according to at least one embodiment of the invention. Here, interface 310a includes a telephone number (e.g., toll-free number 311) used as an identifier to access at least a subset of telecommunications services. To request activation, a user enters in a field 312 another telephone number, which, for example, can be used as a user identification number (user ID 218a, FIG. 2). Button 317 can be used to submit data (i.e., telephone numbers 311 and 312) to request activation. In some embodiments, telecommunications services can be activated for a limited period (e.g., 24 hours), to provide, for example, a period of time during which one can evaluate the telecommunications services. To maintain the activated services beyond the limited period, a user can, for example, use another interface (not shown) to provide additional data, such as billing information.

Figure 3B:
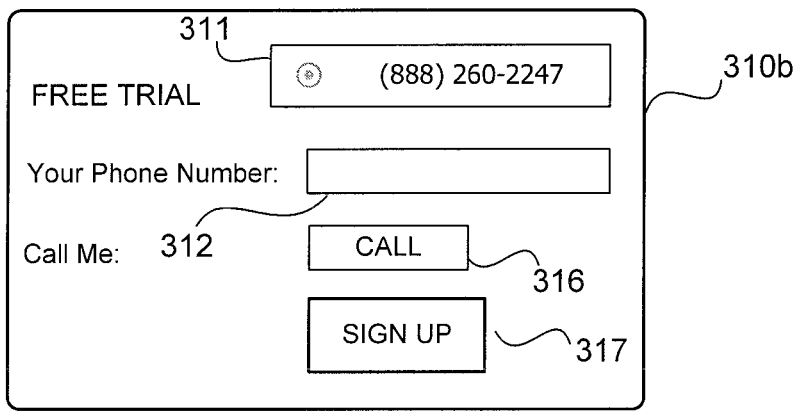
FIG. 3B illustrates another exemplary interface to activate telecommunications services, according to at least one embodiment of the invention.

FIG. 3B illustrates another exemplary interface to activate telecommunications services, according to at least one embodiment of the invention. Here, interface 310b, in addition to the elements shown in interface 310a (FIG. 3A), can include a ("CALL") button 316 for initiating a test to confirm activation. For example, button 316 can generate a call (e.g., as a validation call) to a phone number provided in field 312. As another example, after entering a telephone number into field 312, a user can select CALL button 316 to generate a call from TSP system 220 (FIG. 2) associated with number 311 to the telephone number entered into field 312 to optionally check the call path to the telephone number entered into field 312. Button 317 can be used to submit data (i.e., telephone numbers 311 and 312) to request activation.

Figure 3C:
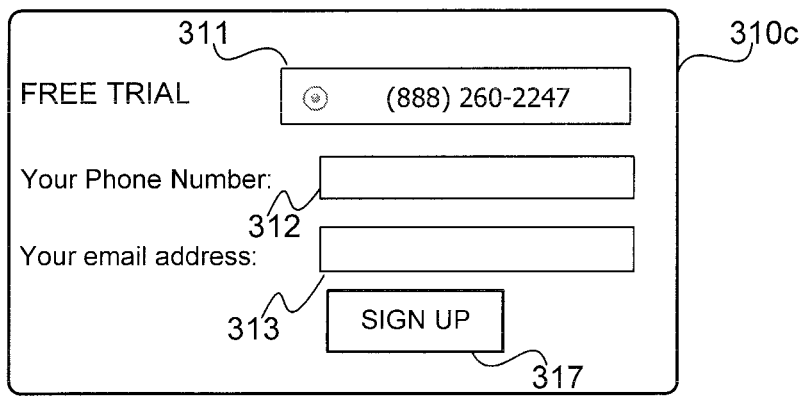
FIG. 3C illustrates yet another exemplary interface to activate telecommunications services, according to at least one embodiment of the invention.

FIG. 3C illustrates yet another exemplary interface to activate telecommunications services, according to at least one embodiment of the invention. Here, interface 310c, in addition to the elements shown in interface 310a (FIG. 3A), shows a field 313 for entering an email address. An email address can be used to provide, for example, voice to email service, facsimile to email service, or other services using email.

FIG. 3D illustrates another interface to activate telecommunications services, according to at least one embodiment of the invention. Here, interface 310d includes a default identifier 311d. If a user desires to use another identifier to access telecommunications services, the user can select one using field 312d, which is optional. In some examples, the telecommunications services can be provided with an auto-receptionist greeting (i.e., a computer-generated greeting). Thus, field 313d allows a user to enter a company name for use in an auto-receptionist greeting. In at least some embodiments, a subset of telecommunications services can include virtual or hosted PBX services with a default configuration of, for example, up to three extensions. For instance, one or more extensions (e.g., extension "1") can be configured with two or more telephone numbers by entering the telephone numbers in fields 314d and 315d. If more than one telephone number is entered, configuration data can include one or more rules to select a telephone number for use with extension "1" in different situations. For example, a TSP system can select the number entered in field 315d as an alternate number if the number entered in field 314d is in use. To configure extension "2," a user can enter a phone number or email address (e.g., to use voice to email services) in field 316d. To configure extension "3," a user can enter a facsimile ("fax") number or email address (e.g., to use fax to email services) in field 317d. In some embodiments, different user contact addresses (e.g., voice-message box, text-messaging address, and/or other numbers of address) can be entered in one or more fields 314d-317d or fields for adding other extensions (not shown). In at least some embodiments, button 318d can be configured to send a single submission of data (i.e., data gathered from one or more of fields 311d to 317d) to request activation.

In at least one embodiment, when a communications device, such as phone 260 (FIG. 2), is used to provision telecommunications services, additional call data (i.e., "other call data") can be used to provide for functionality similarly described and provided for by interface 310d. For example, a telephone making a request call can provide a text string along with a user identification number. A text string can constitute the name of the user calling the identifier 311d, where the text string can be extracted from data provided as calling name ("CNAM") data. Then, the TSP system can associate the text string with a subset of telecommunications services. In some embodiments, the TSP system can convert a text string to sound data representing a name, and then can insert the sound data into data representing a voicemail greeting associated with the identifier. Thus, a TSP system can automatically provide for a default personalized voicemail greeting based on the calling name data, according to some embodiments.

As used herein, the term "extension," at least in one embodiment, can refer to a branch from a group of two, or more branches associated with a main telephone number, such as used in a PBX service (virtual or otherwise). As illustrated in interface 310d, the main telephone number can be identifier 311d or 312d. Three extensions (i.e., branches) are included in the services configuration shown in FIG. 3D. For example, a caller to a telephone number (e.g., identifier 311d or 312d) can be directed to select "1" (i.e., extension "1") to reach a sales department, select "2" (i.e., extension "2") to leave a voicemail (i.e., voice message recording), or select "3" (i.e., extension "3") to connect to a facsimile machine. In at least one embodiment, a user can modify configuration data to add, remove, or change extensions, or any other service or feature, before or after activation of the telecommunications services. In some embodiments, the above-described interfaces, system, components, extensions, elements, and processes can be varied in number, function, structure, configuration, implementation, or any other aspect, and, thereby, are not limited to those shown and described.

Figure 4A:
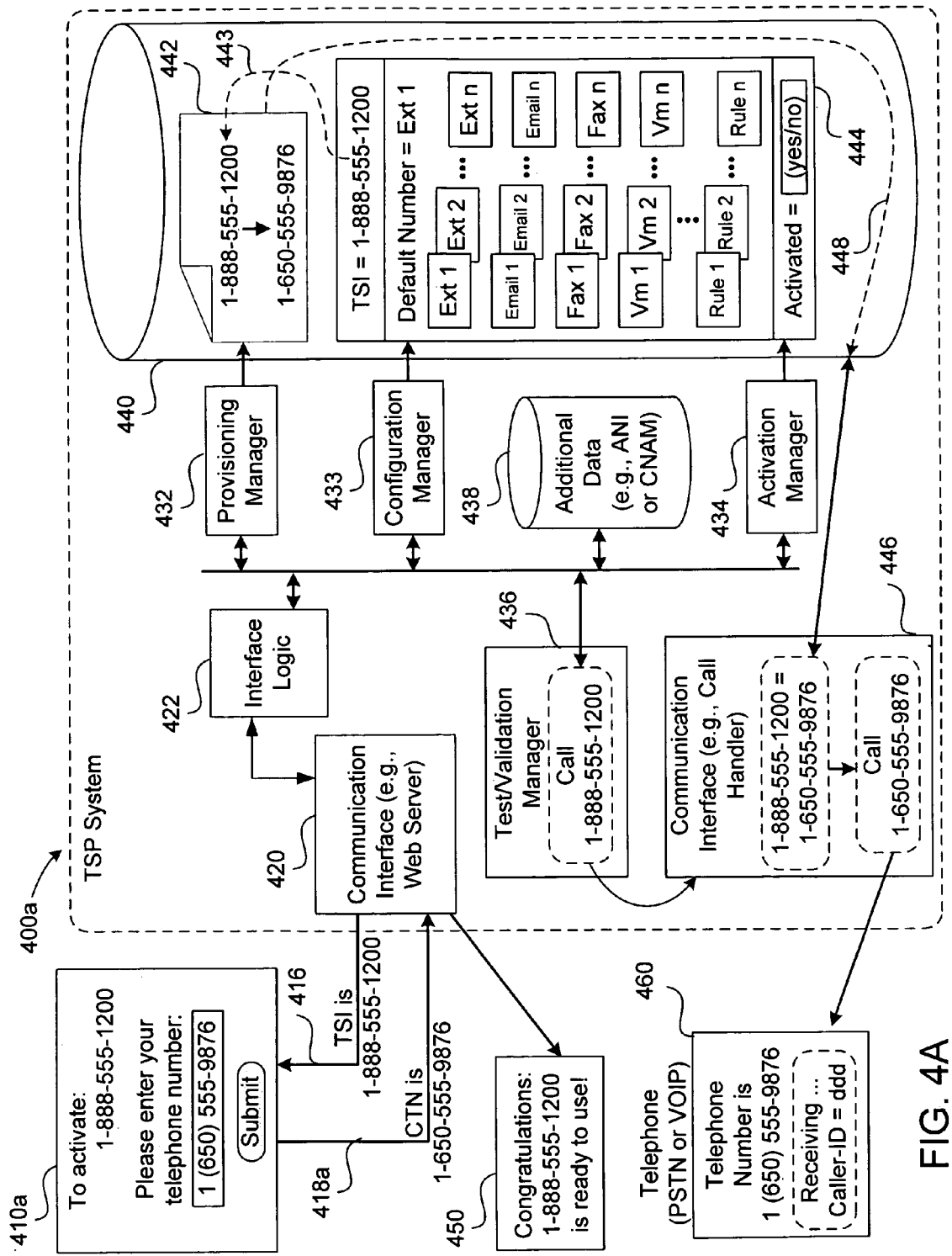
FIG. 4A illustrates a block diagram of an example of a telecommunications service provider system, according to various embodiments of the invention.

FIG. 4A illustrates a block diagram for an example of a telecommunications service provider system, according to various embodiments of the invention. As shown, telecommunications service provider ("TSP") system 400a can be accessed using interface 410a, and can include communication interfaces 420 and 446, interface logic 422, provisioning manager 432, configuration manager 433, activation manager 434, test/validation manager 436, database 438, and database 440. In at least some embodiments, interface 410a can be associated with a telecommunications services identifier ("TSI"), as transmitted via path 416. The term "telecommunications services identifier," or "TSI," can refer, at least in one embodiment, to an "identifier," as described above (e.g., in FIGS. 2 and 3A-3D). A TSI can be used as a main telephone line to access a package or subset of telecommunications services. In some embodiments, a TSI can be presented, as shown in interface 410a. In other embodiments, a TSI need not be presented.

A user can interact with interface 410a to enter a user identification number (e.g., a "user ID"), which can also be referred to as a customer telephone number ("CTN"), address, or alternate address, which, for example, can be a number, email address, or any identifier for identifying a source or a destination of a communication. A CTN can be submitted via path 418a in association with a request for activation of telecommunications services. Communication interface 420 can be configured to pass the request to interface logic 422. In some instances, communication interface 420 can implemented as a server or web server for providing an interface that can implement, for example, web-related protocols. Interface logic 422 can be configured to interface provisioning manager 432, configuration manager 433, and activation manager substantially in parallel or substantially in series (two or more in series). Further, interface logic 422 and can be implemented as one or more applications, one or more application programmable interfaces ("APIs"), in hardware, or any combination thereof.

To illustrate the operation of TSP system 400a, consider the following example. A request for activation can be handled by provisioning manager 432, for example, by creating and storing a user account 442 in database 440. User account 442 can include a binding of a CTN (e.g., 1-650-555-9876) to a TSI (e.g., 1-888-555-1200), which in turn can be associated via an association 443 with a set of telecommunications services being defined by configuration data 444. Configuration data 444 for a subset of telecommunications services can include different types of services (e.g., call extensions, facsimile, email, voicemail, and the like), any number of services in each type (e.g., four call extensions, an email box, and a facsimile), any combination of service types, and/or one or more rules to, for example, govern how services are rendered (e.g., for extension "1", if a call is not answered by the third ring, send the caller to a voicemail box). Configuration manager 433 can be used to create services configuration data 444. In some embodiments, configuration data 444 can be pre-defined (i.e., defined before a user initiates an activation request). Configuration manager 433 can also be used to add, remove, or change telecommunications services after telecommunications services have been initially activated. Database 438 can include automatic number identification ("ANI") data, calling name ("CNAM") data, dialed number identification service ("DNIS") data, or any other data or combination thereof. Database 438 (or portions thereof) can be located external to TSP system 400a. Database 438 can be accessed by provisioning manager 432, configuration manager 433, activation manager 434, or other system components to access or look up additional data associated with a CTN. For example, the name of a caller can be looked up using a telephone number (e.g., a CTN). Other call data (e.g., caller id or ANI data) can be determined using a telephone number (e.g., a CTN).

In some embodiments, when an account is provisioned and configured (e.g., configured in accordance with default configuration data), the account and the telecommunications services associated with the account can be activated. To activate an account, activation manager 434 can, for example, mark an "activated" flag or field in the user account, or in configuration data 444 thereof, to indicate that the user account and its telecommunications services have been activated (e.g., marking "Activated=yes" as shown in configuration data 444). In some embodiments, activating an account can be done in real-time or instantaneous, as least as is perceptible to a user. For example, from the time a CTN is submitted to a user account is activated, an activation delay of a few seconds to a fraction of a second can elapse, especially when there is, for example, minimum network traffic. In other situations, the activation delay can be in minutes or longer. In other embodiments, a user account may not be activated until a CTN is validated. For example, a CTN can be called to cause activation (e.g., requesting a user to press a specific button to activate) or to ensure that the CTN is a functioning telephone number. In yet other embodiments, activation can be delayed by a period to time, such as 24 hours. In some embodiments, after a user account has been activated, a confirmation message 450 can be generated and communicated to a user. Confirmation message 450 can be a visual message (e.g., a text or email message), audio message (e.g., a voice message), or a combination thereof.

In some embodiments, test/validation manager 436 can be used to test or validate a CTN or to confirm activation. For example, to test activation, test/validation manager 436 can interact with communication interface (e.g., a call handler) 446 to call a TSI associated with the CTN, which, in turn, can cause TSP system 400a to generate a call to the CTN after a successful activation. Communication interface 446 can detect whether the TSI is associated with telecommunications services provided by the TSP system 400a. If so, TSP system 400a can look up the associated CTN in database 440, retrieve information relevant to user account 442 via path 448, and route the call to the CTN, which is received at telephone 460. Caller data, such as caller-ID data, of the TSI can be sent to telephone 460.

The above-described components or elements are conceptual components or elements, which can be implemented using software, hardware, or any combination thereof. Some components or elements can be representatives of more than one unit or combined in any combination. In some embodiments, the above-described interfaces, system, components, elements, and processes can be varied in number, function, structure, configuration, implementation, or other aspects and are not limited to those shown and described.

Figure 4B:
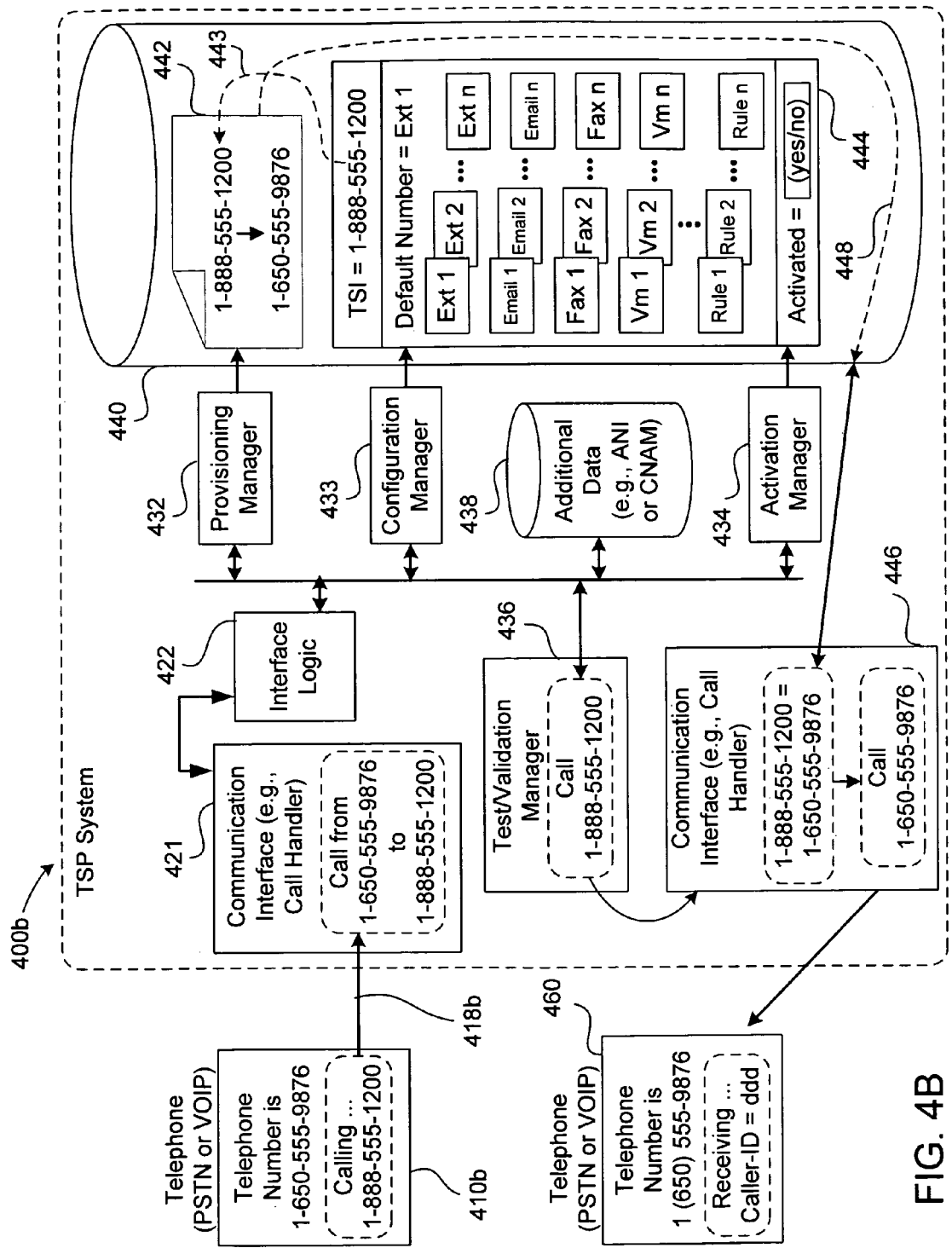
FIG. 4B illustrates a block diagram of another example of a telecommunications service provider system, according to various embodiments of the invention.

FIG. 4B illustrates a block diagram for another example of a telecommunications service provider system, according to various embodiments of the invention. As shown, TSP system 400b can provide the same structure and/or function as TSP system 400a (FIG. 4A), but communication interface 421 (e.g., call handler) can be configured to interact with a telephone 410b. Telephone 410b can be used to call an available TSI (i.e., available for activation) via path 418b. A CTN can be extracted by communication interface 421 from call data, such as caller-ID and ANI-related data. If a CTN or call data fails to transmit from telephone 410b, communication interface 421 can present instructions to a caller to hang up and call again using a specific dialing sequent (e.g., press "*67" before dialing the TSI) so that a CTN can be transmitted to, and extracted by, communication interface 421. Communication interface 421 then can pass the extracted CTN and the called TSI to interface logic 422 as a request to activate telecommunications services. In some embodiments, interface logic 422 can access database 438 (e.g., accessing CNAM data) to look up a caller's name, which can be used to provide enhanced services (e.g., using the caller's name in subsequent interactive voice responses ("IVR") to greet the caller, such as in a voicemail greeting). The request for activation can continue to be processed with other elements that are described in FIG. 4A.

Figure 5A:
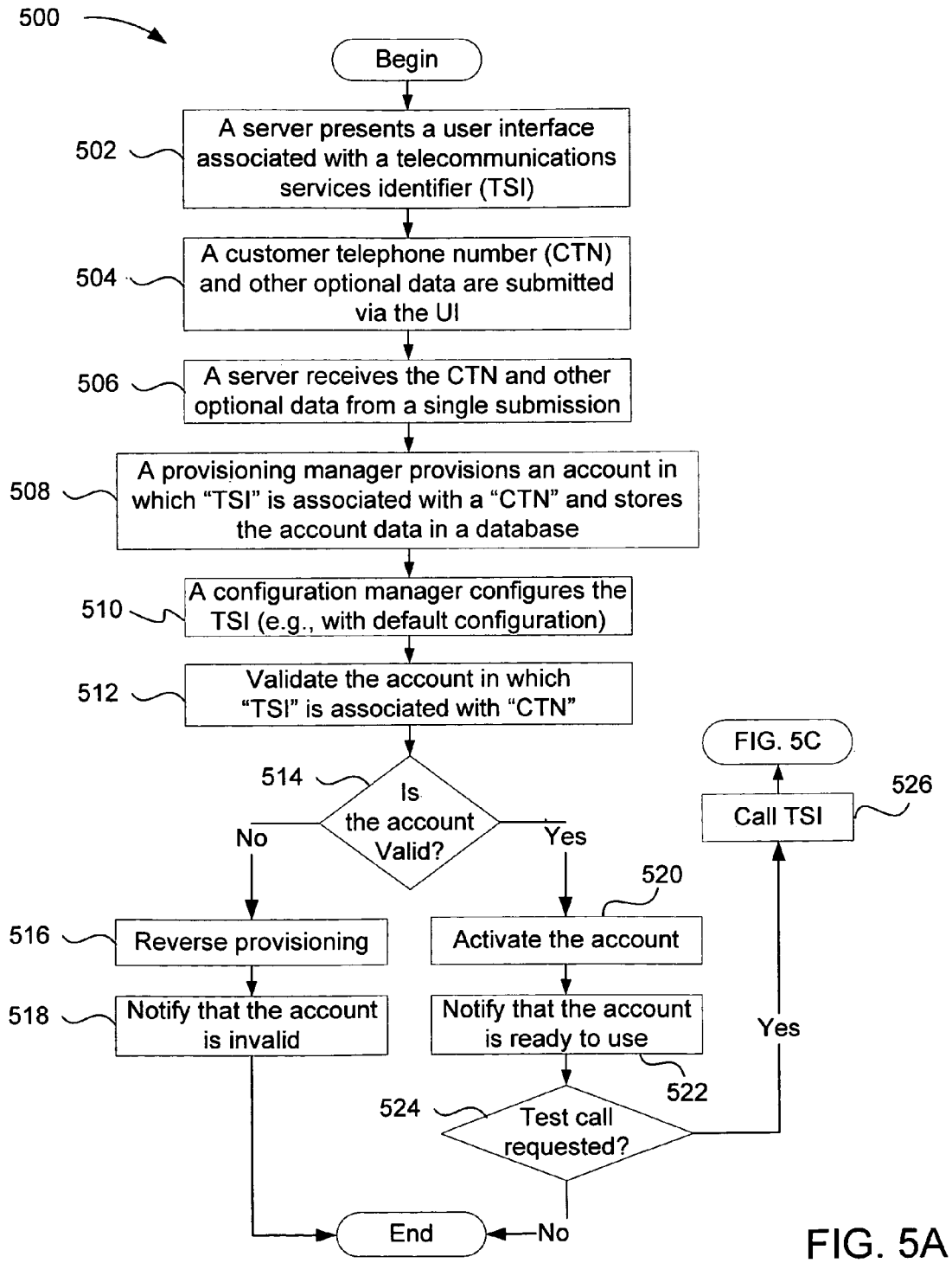
FIG. 5A is a flow diagram depicting an example of a method for activating telecommunications services, according to at least one embodiment of the invention.

FIG. 5A is a flow diagram depicting an example of a method for activating telecommunications services, according to at least one embodiment of the invention. Here, flow 500 begins with a server presenting an interface (e.g., a user interface) at 502, the interface presenting a TSI. For example, the TSI can be presented on a web page. A request for activation can be transmitted (e.g., in a single data submission) at 504, which includes a CTN and other optional data, such as another address (e.g., telephone number, email address, facsimile number, or the like). A server (e.g., interface logic 422, FIG. 4A) can be configured to receive the data transmission at 506. At 508, a provisioning manager (e.g., provisioning manager 432 of FIG. 4A) provisions, as described above, the TSI in a user account. At 510, a configuration manager configures telecommunications services associated with the TSI, or a default, pre-configured services configuration can be configured or used. Here, flow 500 illustrates that a user account can be validated, at 512, before activation. For example, a test/validation manager (e.g., test/validation manager 436 of FIG. 4A) can be used to validate the CTN as described above. If the user account associated with the CTN is not valid, at 514, the provisioning of the TSI at 508 can be reversed (e.g., by dis-associating the user account from the CTN, and marking the TSI as available for subsequent activation) at 516. At 518, a message notifying that the user account or CTN is invalid can be generated or communicated to a user. The message can be a voice message or a text message. If the user account related to the CTN is determined to be valid at 514, the user account can be activated at 520. At 522, a confirmation message can be generated and communicated to a user. Again, the message can be an audio or visual message. If a test call is requested at 524, a call can be made to the TSI at 526 to test whether the call is properly routed to the CTN. The call can be handled as described in FIG. 5C below. In some embodiments, the above-described flow, components, elements, and acts can be varied in number, function, structure, configuration, implementation, or other aspects and are not limited to those shown and described.

Figure 5B:
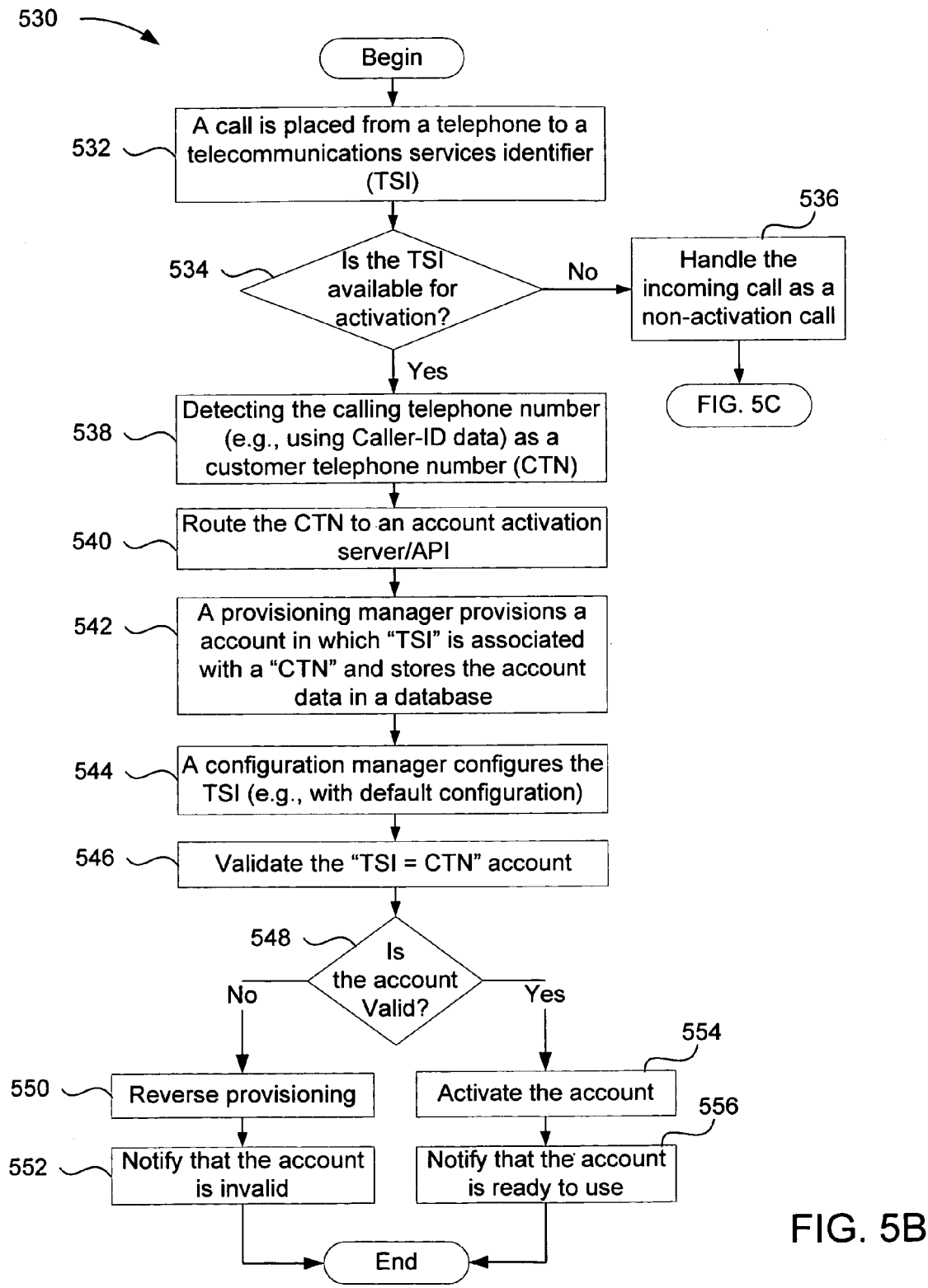
FIG. 5B is a flow diagram depicting an example of another method for activating telecommunications services, according to at least one embodiment of the invention.

FIG. 5B is a flow diagram depicting an example of another method for activating telecommunications services, according to at least one embodiment of the invention. Here, flow 530 begins at 532, with a call being placed from a telephone to a TSI in an attempt to activate telecommunications services associated with the TSI. If the TSI is not available for activation at 534, the call can be handled as a non-activated call at 536, as described in FIG. 5C below. If the TSI is available for activation at 534, a CTN can be extracted at 538 using caller-ID data, ANI-related data, or the like. If a CTN is not present, the caller can be instructed to call again. After a CTN is extracted, it can be routed to a user account activation server/API (e.g., interface logic 422 of FIG. 4A) at 540. At 542, a provisioning manager (e.g., provisioning manager 432 of FIG. 4A) can provision the TSI, and can associate it with a user account. At 544, a configuration manager configures telecommunications services associated with the TSI, or provides for a default, pre-configured configuration that can be used. A user account can be validated at 546 before activation. For example, a test/validation manager (e.g., test/validation manager 436 of FIG. 4A) can be used to validate the CTN as described above. If the account and the related CTN are not valid at 548, the provisioning of the TSI at 542 can be reversed (e.g., by removing the account and marking the TSI as available for subsequent activation) at 550. At 552, a message notifying that the user account or CTN is invalid can be generated and communicated to a user. The message can be a voice message or text message (i.e., if the call-in telephone indicates that it has the capability to display a text message). If the user account or its CTN is valid at 548, the account can be activated at 554. At 556, a confirmation message (voice or text) can generate and communicated to a user. In some embodiments, the above-described flow, components, elements, and acts can be varied in number, function, structure, configuration, implementation, or other aspects and are not limited to those shown and described.

Figure 5C:
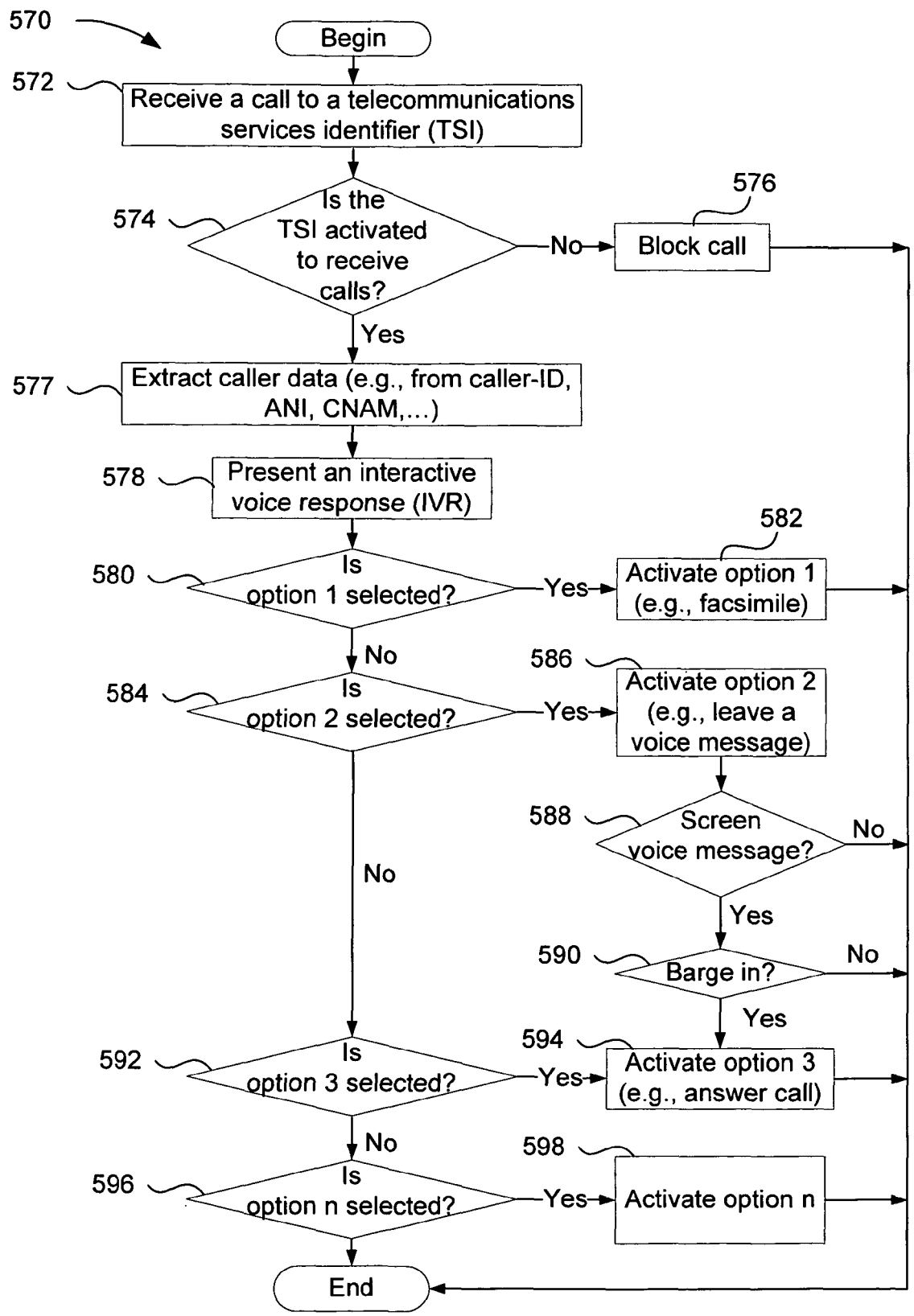
FIG. 5C is a flow diagram depicting an example of a method for providing telecommunications services, according to various embodiments of the invention.

FIG. 5C is a flow diagram depicting an example of a method for providing telecommunications services, according to various embodiments of the invention. Here, flow 530 begins with a call to a TSI being received at 572. If the TSI is not activated to receive calls at 574, the call can be blocked at 576. If the TSI is activated to receive calls at 574, call data (e.g., caller-ID, ANI, CNAM, or similar data) can be extracted or otherwise determined at 577. Here, the TSI is shown associated with a virtual or hosted PBX service having a number of extensions (e.g., 1 to n). At 578, an interactive voice response ("IVR") or auto-receptionist can be played, instructing the caller to select an extension to a desired destination. If a name associated with the call-in telephone number is found, it can be speech synthesized and used in the IVR to personalize the IVR or in a voicemail box greeting. If extension 1 is selected at 580, extension 1 (e.g., facsimile) can be activated at 582. If extension 2 is selected at 584, extension 2 can be activated at 586. Extension 2, here, is illustrated with a voice messaging service (i.e., the caller selects extension 2 to leave a voice message). A voice messaging service, for example, can be configured to include screening and/or barging-in capabilities. When a caller is leaving a voice message, the callee (i.e., at the TSI) can, at 588, screen the voice message as it is being recorded. If the callee desires, at 590, the callee can barge in (i.e., connect to the caller and start a live conversation) at 594. If extension 3 is selected at 592, extension 3 can be activated at 594, for example, to answer the call and start a live conversation. If extension "n" is selected at 596, extension "n" can be activated at 598, and can be configured as any telecommunications service. If no extension is selected, the IVR can be replayed for a limited number of times (e.g., once) before the call is terminated at the TSI.

Here, telecommunications services, such as extensions 1 to n, can be offered at activation using initial (or default) service configuration data (e.g., as shown in interface 310d of FIG. 3D). In some embodiments, extensions 1 to n, or any number of extensions can be configured (not shown) by a user after activation. For example, a user can access a TSP system to remove an extension, add an extension, modify an extension, such as extension 2 to provide the above-described services (i.e., voice messaging with screening and barging-in capabilities). In some embodiments, a voicemail box can be configured to forward a voice massage to an email box as an audio message or converted-text message. In other embodiments, a user can configure to receive a notification when a new voice message has been recorded. Other telecommunications services can be configured and reconfigured to implement various PBX-related services (e.g., call-forwarding service or email services, such as facsimile-to-email or voice-to-email), and can also be added, removed, or modified at least in one embodiment. For example, a call-forwarding service (i.e., a call to the TSI is forwarded to the user identification number) can be configured to also forward caller data (i.e., caller-ID data) received at the TSI to the user identification number. In some embodiments, the above-described flow, components, elements, services, and acts can be varied in number, function, structure, configuration, implementation, or other aspects and are not limited to those shown and described.

Figure 6:
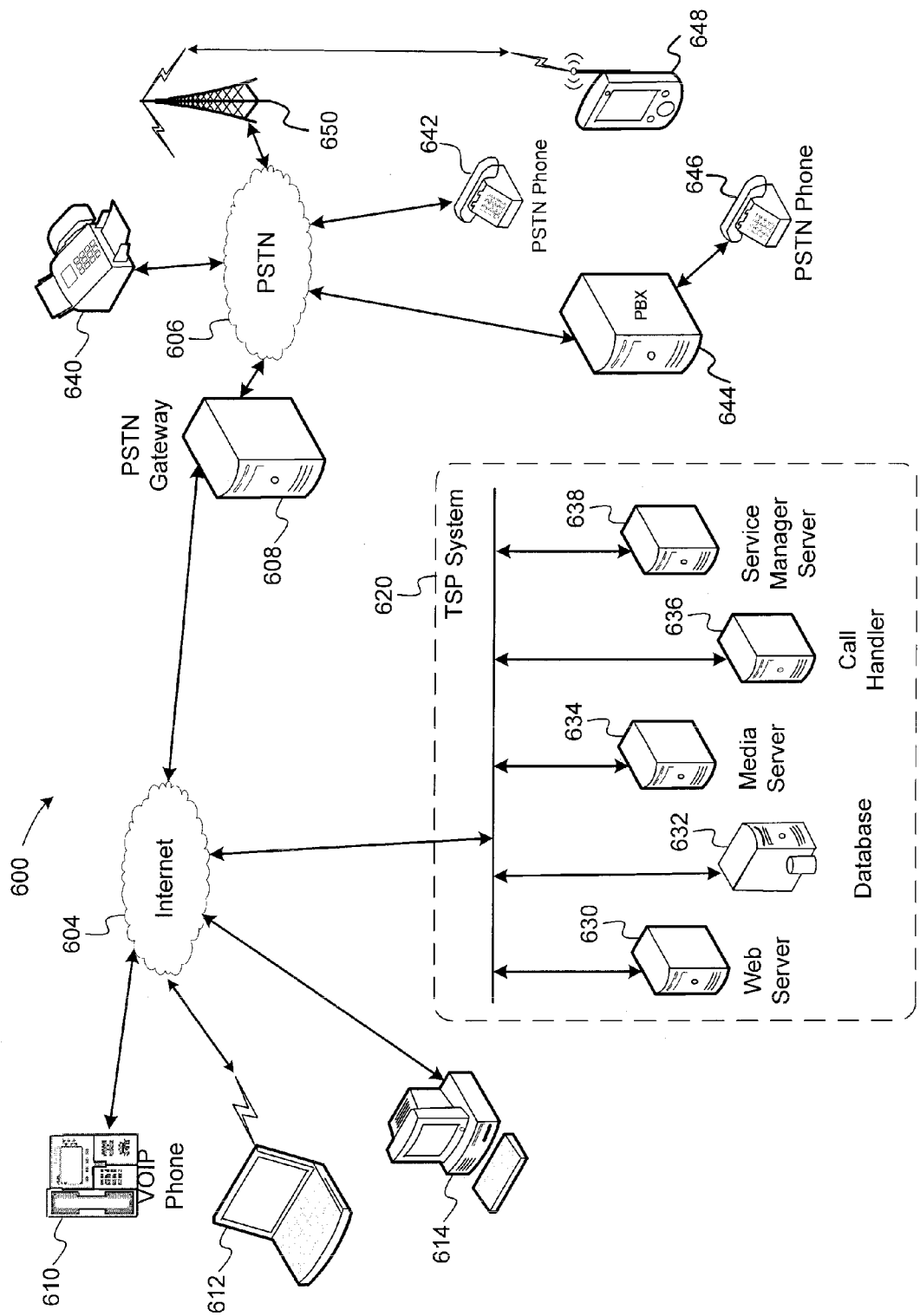
FIG. 6 is a diagram of a telecommunications service provider system and its components, according to at least one embodiment of the invention.

FIG. 6 is a diagram of a telecommunications service provider system and its components, according to at least one embodiment of the invention. Telecommunications services provided by TSP system 620 can be activated, accessed, or both using any of the illustrated endpoints: VoIP/Internet endpoints 610-614, facsimile endpoints 640, PSTN endpoints 642, enterprise PBX endpoints 644-646, cellular endpoints 648, and the like. Any of these endpoints can be configured to operate as a caller device, callee device, or both.

TSP system 620 can include any number and any combination of the following: web server 630, database 632, media server 634, call handler 636, and service manager server 638. In some embodiments, TSP system 620 can include fewer or additional types of "server." Here, "server," "database," and "call handler" (collectively, "system components") are conceptual labels according to functionalities. In implementation, functionalities of these and other system components can be provided using software (e.g., applications, firmware, or the like), hardware (e.g., circuit boards, computers, physical servers, or the like), or any combination thereof. For example, web server 630 can provide functionalities including those provided by communication interface 420 (FIG. 4A) to interface with one or more web-based interfaces (e.g., interface 410a, FIG. 4A). Database 632 can provide functionalities including those provided by databases 438 and 440 (FIG. 4A). Media server 634 can provide functionalities relating to audio clips (e.g., retrieving or presenting interactive voice response ("IVR") or auto receptionist), video clips, or other media. Call handler 636 can provide functionalities including those provided by a call router (i.e., routing calls according to destinations), communication interface 446 (FIG. 4A), and/or communication interface 421 (FIG. 4B). Service manager server 638 can provide functionalities including those provided by one or more of the following: interface logic 422 (FIG. 4A), provisioning manager 432 (FIG. 4A), configuration manager 433 (FIG. 4A), activation manager 434 (FIG. 4A), and test/validation manager 436 (FIG. 4A).

Figure 7:
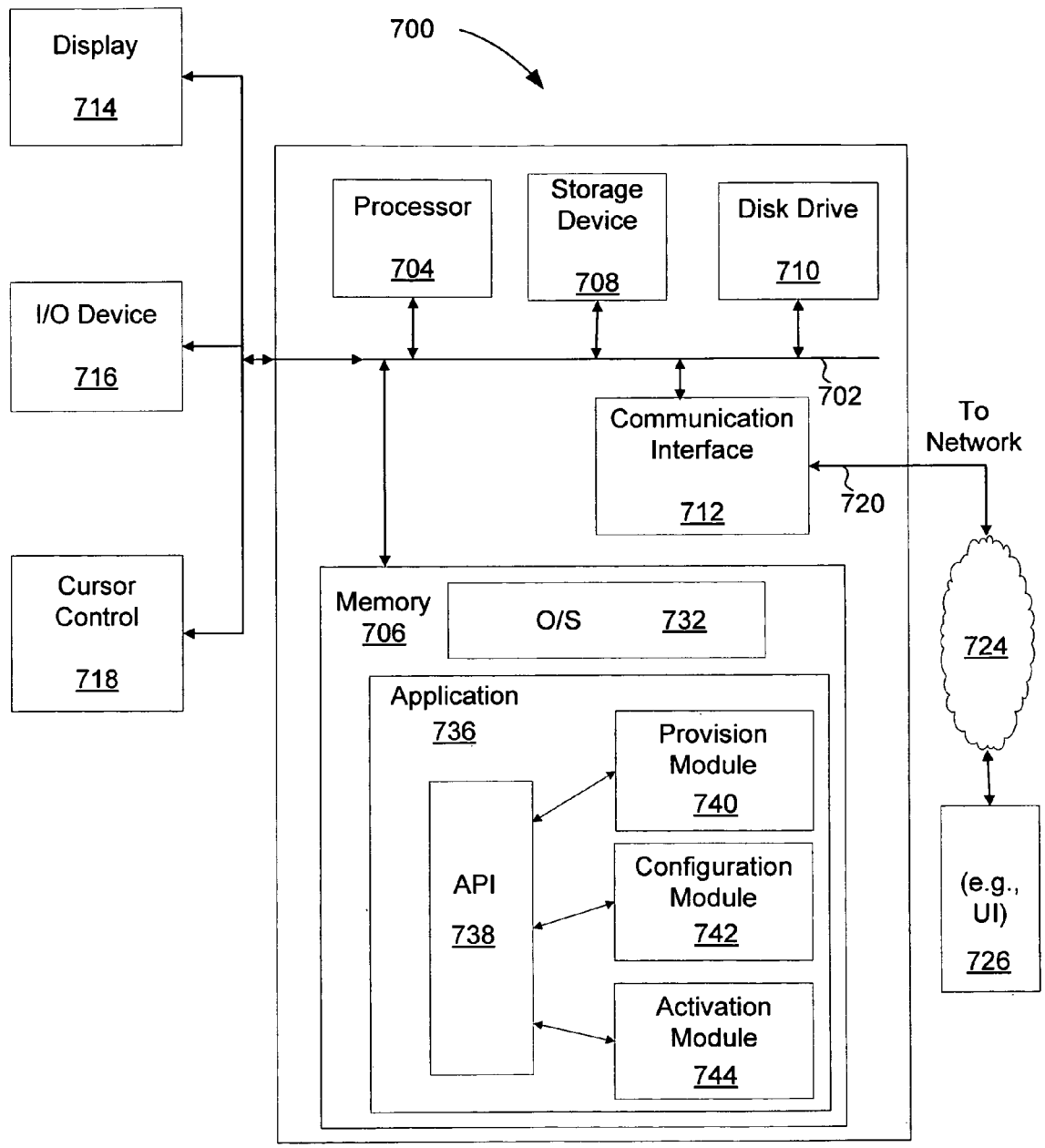
FIG. 7 illustrates an exemplary computer system suitable for activating telecommunications services, according to at least one embodiment of the invention.

FIG. 7 illustrates an exemplary computer system suitable for activating telecommunications services, according to at least one embodiment of the invention. In some examples, computer system 700 can be used to implement computer programs, applications, methods, processes, or other software to perform the above-described techniques and to realize the structures described herein. Computer system 700 includes a bus 702 or other communication mechanism for communicating information, which interconnects subsystems and devices, such as a processor 704, a system memory ("memory") 706, a storage device 708 (e.g., ROM), a disk drive 710 (e.g., magnetic or optical), a communication interface 712 (e.g., modem or Ethernet card), a display 714 (e.g., CRT or LCD), an input device 716 (e.g., keyboard), and a pointer cursor control 718 (e.g., mouse or trackball). In one embodiment, pointer cursor control 718 invokes one or more commands that, at least in part, modify the rules stored, for example in memory 706, to define services configuration for telecommunications service activation. According to some examples, computer system 706 performs specific operations in which processor 704 executes one or more sequences of one or more instructions stored in system memory 706. Such instructions can be read into system memory 706 from another computer readable medium, such as static storage device 708 or disk drive 710. In some examples, hard-wired circuitry can be used in place of or in combination with software instructions for implementation. In the example shown, system memory 706 includes modules of executable instructions for implementing an operation system ("O/S") 732, and an application 736, which can be host, server, or web services-based, as well as distributed (i.e., enterprise). In some embodiments, application 736 can implement application programming interface ("API") 738, and/or other programs, procedures or the like. Further, application 736 can include a module of executable instructions for implementing a provision module 740, as well as modules of executable instructions for implementing a configuration module 742 and an activation module 744. Provision module 740 includes instructions for provisioning a user account and its configuration data. In some cases, provision module 740 can include instructions for associating identifiers for accessing telecommunications services to user IDs (e.g., customer telephone number or alternative addresses). Configuration module 742 includes instructions for creating services configurations or configuring telecommunications services. Activation module 744 includes instructions for activating user accounts or telecommunications services.

The term "computer readable medium" refers, at least in one embodiment, to any medium that participates in providing instructions to processor 704 for execution. Such a medium can take many forms, including but not limited to, non-volatile media, volatile media, and transmission media. Non-volatile media includes, for example, optical or magnetic disks, such as disk drive 710. Volatile media includes dynamic memory, such as system memory 706. Transmission media includes coaxial cables, copper wire, and fiber optics, including wires that comprise bus 702. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, electromagnetic waveforms, or any other medium from which a computer can read.

In some examples, execution of the sequences of instructions can be performed by a single computer system 700. According to some examples, two or more computer systems 700 coupled by communication link 720 (e.g., LAN, PSTN, or wireless network) can perform the sequence of instructions in coordination with one another. Computer system 700 interacts with network 724 and networked devices 726 via communication link 720. Computer system 700 can transmit and receive messages, data, and instructions, including program code (i.e., application code) through communication link 720 and communication interface 712. Received program code can be executed by processor 704 as it is received, and/or stored in disk drive 710, or other non-volatile storage for later execution. In one embodiment, system 700 is implemented as a hand-held device. But in other embodiments, system 700 can be implemented as a personal computer (i.e., a desktop computer) or any other computing device. In at least one embodiment, any of the above-described delivery systems can be implemented as a single system 700 or can be implemented in a distributed architecture including multiple systems 700.

In view of the foregoing, examples of a real-time telecommunications services activation are described. Telecommunications service provider systems can be implemented using real-time interfaces that are configured to control and manage communication dynamically over an IP network a PSTN network, or any other communications network.

In at least some of the embodiments of the invention, the structures and/or functions of any of the above-described interfaces and panels can be implemented in software, hardware, firmware, circuitry, or a combination thereof. Note that the structures and constituent elements shown throughout, as well as their functionality, can be aggregated with one or more other structures or elements.

Alternatively, the elements and their functionality can be subdivided into constituent sub-elements, if any. As software, the above-described described techniques can be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment can readily be interchanged with other embodiments.

Thus, the foregoing descriptions of specific embodiments of the invention are presented for purposes of illustration and description. They are not intended to be exhaustive or to limit the invention to the precise forms disclosed; many alternatives, modifications, equivalents, and variations are possible in view of the above teachings. For the purpose of clarity, technical material that is known in the technical fields related to the embodiments has not been described in detail to avoid unnecessarily obscuring the description. Thus, the various embodiments can be modified within the scope and equivalents of the appended claims. Further, the embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the present invention; rather any specific embodiment may provide one or more of the advantages discussed above. In the claims, elements and/or operations do not imply any particular order of operation, unless explicitly stated in the claims. It is intended that the following claims and their equivalents define the scope of the invention

The invention claimed is:

1. A method for activating telecommunications services, comprising:
   prior to receiving a request to activate a subset of private branch exchange ("PBX") telecommunication services:
      creating, in a telecommunications service provider ("TSP") system including one or more processors and one or more storage devices, an unassociated PBX user account that is unassociated with any PBX user, the unassociated PBX user account being configured with the subset of PBX telecommunications services; and
      assigning a system telephone number to the unassociated PBX user account for accessing the subset of PBX telecommunications services;
   providing an activation user interface for presentation to a PBX user on a mobile device over a communication network;
   while maintaining presentation of the activation user interface to the PBX user and without transitioning to a different user interface being presented to the PBX user:
      receiving, in the TSP system and over the communication network, the request to activate the subset of PBX telecommunications services from the PBX user through the user interface, the request including a PBX user telephone number submitted through the user interface to facilitate the activation of the subset of the PBX telecommunications services and identifying the subset of PBX telecommunication services; and
      in response to receiving the request to activate the identified subset of PBX telecommunications services, automatically activating, by the TSP system, the unassociated PBX user account to form an associated PBX user account comprising binding the PBX user telephone number submitted through the user interface to the system telephone number; and
   after automatically activating the unassociated PBX user account to form the associated PBX user account, enabling the PBX user to use the subset of PBX telecommunications services to communicate over the communication network using the mobile device.

2. The method of claim 1 further comprising:
   generating a call to a communication device associated with the PBX user telephone number to confirm activating the subset of PBX telecommunications services.

3. The method of claim 1 further comprising:
   receiving the request to activate the subset of telecommunications services and the PBX user telephone number as a single submission of data; and
   activating the PBX user account responsive to the single submission.

4. The method of claim 1 further comprising:
   detecting a request call destined to the system telephone number, the request call being associated with the PBX user telephone number; and
   accessing call data associated with the request call to obtain the PBX user telephone number.

5. The method of claim 4 further comprising:
   accessing other call data associated with the request call to obtain a text string associated with the PBX user telephone number;
   associating the text string with the subset of PBX telecommunications services;
   converting the text string to sound data representing a name; and
   inserting the sound data into data representing a voicemail greeting associated with the system telephone number.

6. The method of claim 1 wherein receiving the request comprises:
   presenting the system telephone number in the activation user interface;
   presenting in the activation user interface a field to accept the PBX user telephone number; and
   associating the PBX user telephone number with the system telephone number to form the associated user account with the PBX user telephone number.

7. The method of claim 6 wherein presenting the field is simultaneous to presenting the system telephone number.

8. The method of claim 1 wherein activating the PBX user account comprises:
   forwarding a call destined to the system telephone number to the PBX user telephone number along with caller data.

9. The method of claim 1, wherein receiving the request further comprises:
   receiving data representing an alternate address; and
   associating the data representing the alternate address with an extension.

10. The method of claim 1, wherein forming the associated PBX user account includes downloading an executable instruction to a mobile phone associated with the PBX user telephone number for communicating with the TSP system to enable access by the mobile phone to the subset of telecommunications services.

11. A system comprising one or more computers and one or more storage devices storing instructions that when executed by the one or more computers cause the one or more computers to perform operations comprising:
   prior to receiving a request to activate a subset of private branch exchange ("PBX") telecommunication services:

creating, in a telecommunications service provider ("TSP") system including one or more processors and one or more storage devices, an unassociated PBX user account that is unassociated with any PBX user, the unassociated PBX user account being configured with the subset of PBX telecommunications services; and assigning a system telephone number to the unassociated PBX user account for accessing the subset of PBX telecommunications services;

providing an activation user interface for presentation to a PBX user on a mobile device over a communication network;

while maintaining presentation of the activation user interface to the PBX user and without transitioning to a different user interface being presented to the PBX user:
receiving, in the TSP system and over the communication network, the request to activate the subset of PBX telecommunications services from the PBX user through the user interface, the request including a PBX user telephone number submitted through the user interface to facilitate the activation of the subset of the PBX telecommunications services and identifying the subset of PBX telecommunication services; and in response to receiving the request to activate the identified subset of PBX telecommunications services, automatically activating, by the TSP system, the unassociated PBX user account to form an associated PBX user account comprising binding the PBX user telephone number submitted through the user interface to the system telephone number; and after automatically activating the unassociated PBX user account to form the associated PBX user account, enabling the PBX user to use the subset of PBX telecommunications services to communicate over the communication network using the mobile device.

12. The system of claim 11, the operations further comprising:
generating a call to a communication device associated with the PBX user telephone number to confirm activating the subset of PBX telecommunications services.

13. The system of claim 11, the operations further comprising:
receiving the request to activate the subset of telecommunications services and the PBX user telephone number as a single submission of data; and
activating the PBX user account responsive to the single submission.

14. The system of claim 11, the operations further comprising:
detecting a request call destined to the system telephone number, the request call being associated with the PBX user telephone number; and
accessing call data associated with the request call to obtain the PBX user telephone number.

15. The system of claim 14, the operations further comprising:
accessing other call data associated with the request call to obtain a text string associated with the PBX user telephone number;
associating the text string with the subset of PBX telecommunications services;
converting the text string to sound data representing a name; and
inserting the sound data into data representing a voicemail greeting associated with the system telephone number.

16. The system of claim 11, wherein receiving the request comprises:
presenting the system telephone number in the activation user interface;
presenting in the activation user interface a field to accept the PBX user telephone number; and
associating the PBX user telephone number with the system telephone number to form the associated user account with the PBX user telephone number.

17. The system of claim 16, wherein presenting the field is simultaneous to presenting the system telephone number.

18. The system of claim 11, wherein activating the PBX user account comprises:
forwarding a call destined to the system telephone number to the PBX user telephone number along with caller data.

19. The system of claim 11, wherein receiving the request further comprises:
receiving data representing an alternate address; and
associating the data representing the alternate address with an extension.

20. The system of claim 11, wherein forming the associated PBX user account includes downloading an executable instruction to a mobile phone associated with the PBX user telephone number for communicating with the TSP system to enable access by the mobile phone to the subset of telecommunications services.

21. One or more non-transitory computer storage media storing instructions that when executed by one or more computers cause the one or more computers to perform operations comprising:
prior to receiving a request to activate a subset of private branch exchange ("PBX") telecommunication services:
creating, in a telecommunications service provider ("TSP") system including one or more processors and one or more storage devices, an unassociated PBX user account that is unassociated with any PBX user, the unassociated PBX user account being configured with the subset of PBX telecommunications services; and
assigning a system telephone number to the unassociated PBX user account for accessing the subset of PBX telecommunications services;
providing an activation user interface for presentation to a PBX user on a mobile device over a communication network;
while maintaining presentation of the activation user interface to the PBX user and without transitioning to a different user interface being presented to the PBX user:
receiving, in the TSP system and over the communication network, the request to activate the subset of PBX telecommunications services from the PBX user through the user interface, the request including a PBX user telephone number submitted through the user interface to facilitate the activation of the subset of the PBX telecommunications services and identifying the subset of PBX telecommunication services; and
in response to receiving the request to activate the identified subset of PBX telecommunications services, automatically activating, by the TSP system, the unassociated PBX user account to form an associated PBX user account comprising binding the PBX user telephone number submitted through the user interface to the system telephone number; and
after automatically activating the unassociated PBX user account to form the associated PBX user account, enabling the PBX user to use the subset of PBX telecommunications services to communicate over the communication network using the mobile device.

22. The non-transitory computer storage media of claim 21, the operations further comprising:
generating a call to a communication device associated with the PBX user telephone number to confirm activating the subset of PBX telecommunications services.

23. The non-transitory computer storage media of claim 21, the operations further comprising:
receiving the request to activate the subset of telecommunications services and the PBX user telephone number as a single submission of data; and
activating the PBX user account responsive to the single submission.

* * * * *